United States Patent [19]

Champan

[11] 3,997,734
[45] Dec. 14, 1976

[54] TELEPHONE HOLD ATTACHMENT

[75] Inventor: Louis W. Champan, Kent, Wash.
[73] Assignee: Melco, Bellevue, Wash.
[22] Filed: Nov. 24, 1975
[21] Appl. No.: 634,598

[52] U.S. Cl. .............................................. 179/81 R
[51] Int. Cl.² ......................................... H04M 1/00
[58] Field of Search ........................... 179/81 R, 99

[56] References Cited
UNITED STATES PATENTS

| | | | |
|---|---|---|---|
| 3,725,600 | 4/1973 | Hutton | 179/99 |
| 3,742,151 | 6/1973 | Ruether | 179/99 |
| 3,857,072 | 12/1974 | James | 179/99 |
| 3,870,831 | 3/1975 | McCarley | 179/99 |

Primary Examiner—Kathleen H. Claffy
Assistant Examiner—Joseph Popek
Attorney, Agent, or Firm—Sherman Levy

[57] ABSTRACT

A hold attachment for a single-line telephone to allow the user to replace the handset and resume a call later or at another location. The attachment consists of a non-polarity-sensitive substitution circuit which is connected across the telephone line without regard for line polarity, the circuit including a bridge rectifier, a zener diode, the winding of a holding relay, a light-emitting diode and a manual switch, the contacts of the relay being connected in parallel with the switch. To place a call on "hold", the switch is operated while the handset is placed on hook, and then released. The line voltage causes the zener diode to conduct and energizes the relay, whereby the relay contacts shunt the switch, which maintains the holding connection across the line after the switch is released, and which provides a load resistance such that the switching equipment in the central office will remain held up, maintaining the talking connections to the called telephone. The hold condition is released by lifting the handset of this or any other telephone on the same line. This reduces the resistance across the line sufficiently to drop the line voltage below the zener-sustaining value, causing the relay to release. The light-emitting diode is illuminated during the hold period and is extinguished upon release of the relay.

7 Claims, 2 Drawing Figures

TELEPHONE HOLD ATTACHMENT

This invention relates to telephone hold devices, and more particularly to a hold attachment for a single-line telephone to allow a user to replace the handset of a telephone on the called line and resume the call later or at another telephone on the line.

A main object of the invention is to provide a novel and improved telephone hold attachment which is simple in construction, which is easy to install, which is not polarity-sensitive, which is reliable in operation, and which allows a user to maintain a talking connection while his handset is replaced on hook for a period of time, or while he moves to a different telephone on the same line.

A further object of the invention is to provide an improved telephone hold attachment which is composed of relatively inexpensive components, which is compact in size, which can be connected without regard for line polarity, which is substantially immune to line transients, and which can be physically attached to any convenient location on the associated telephone.

A still further object of the invention is to provide an improved telephone hold attachment which can be quickly and easily connected to a single-line telephone without regard for polarity and which can be operated to maintain a talking connection to the associated line while the handset of the called telephone is replaced and which is automatically released when the handset of the telephone or that of any other telephone on the same line is picked up, the hold attachment providing a positive visual indication of its operating condition.

A still further object of the invention is to provide an improved telephone hold attachment which simulates the line loading of the calling telephone when the handset of said telephone is replaced on hook, so that the associated central office equipment will continue to maintain the talking connection, and which will automatically release responsive to the change in line loading which occurs when said handset, or that of any other telephone on the same line, is lifted from an on-hook position.

Further objects and advantages of the invention will become apparent from the following description and claims, and from the accompanying drawings, wherein:

Figure 1:
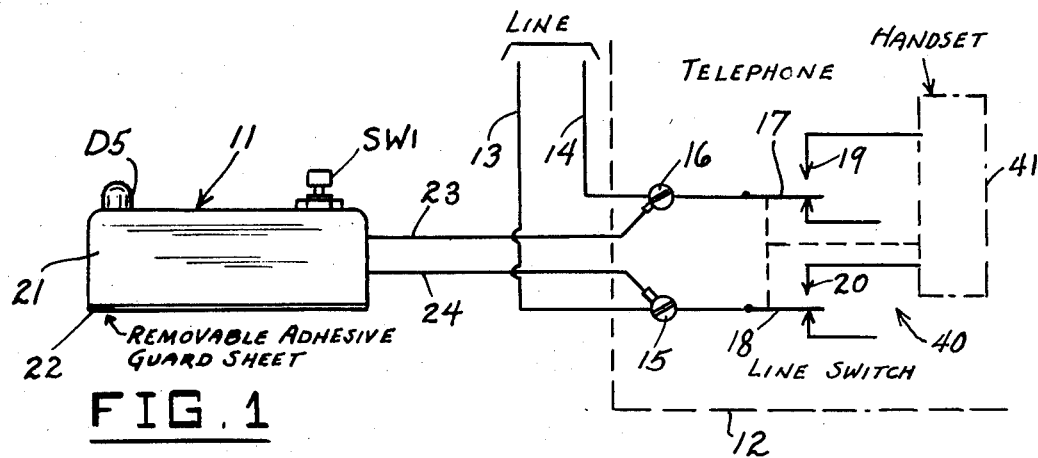
FIG. 1 is an elevational view of an improved telephone hold attachment according to the present invention, showing its electrical connections to an associated telephone.

Referring to the drawings, 11 designates a hold attachment according to the present invention for use with a telephone 12 which is connected to the tip and ring conductors 13 and 14 of a telephone single-line system at screw terminals 15 and 16. The telephone 12 is provided with the conventional hook switch assembly 40 comprising the switch poles 17 and 18, connected respectively to the terminals 16 and 15, which rise to engage their upper contacts 19 and 20 when the associated handset 41 is lifted, to thereby connect the handset and telephone network to the line conductors 13 and 14.

The hold attachment 11 comprises a housing 21 having suitable means for physically securing it to the associated telephone 12 at a convenient location thereon, for example, to one side of the telephone. The securing means may comprise an adhesive coating on the bottom of housing 21, normally covered by a removable guard sheet 22, which can be removed to expose the adhesive and allow the attachment to be mounted on said one side of the telephone.

The attachment 11 has the two connection wires 23 and 24 provided with terminal lugs, allowing said wires to be readily connected to the tip and ring conductors 13 and 14 at the screw terminals 16 and 15 in the telephone 12.

Figure 2:
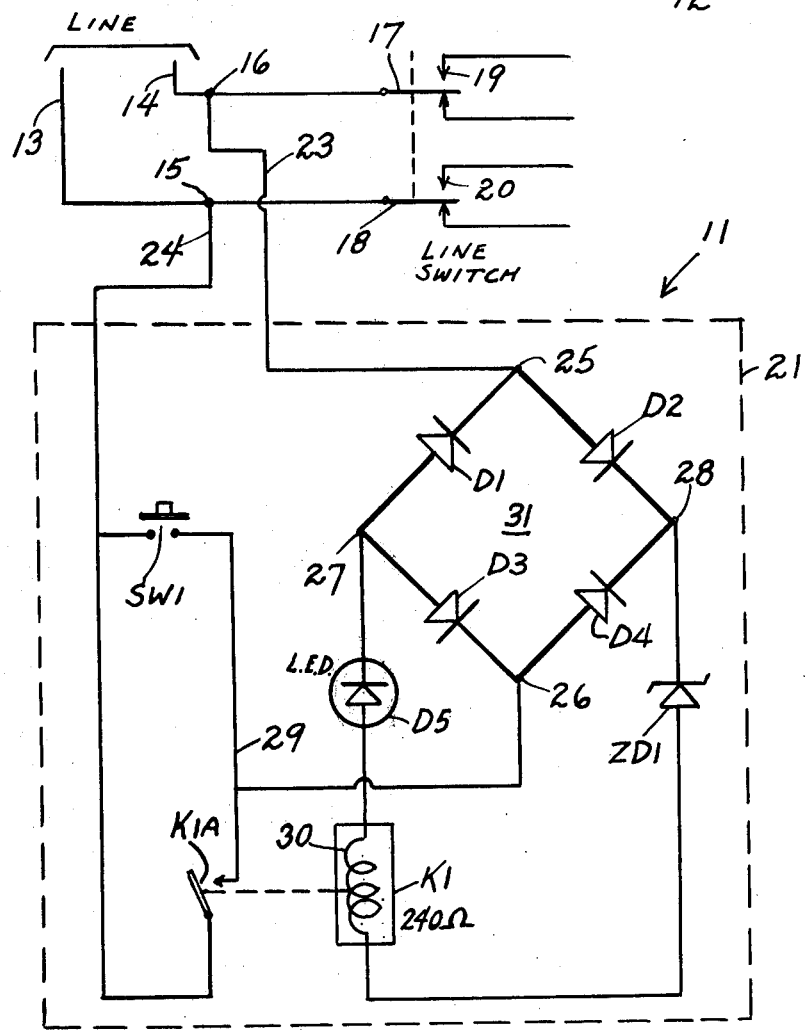
FIG. 2 is a wiring diagram of the telephone hold attachment and the electrical connections of FIG. 1.

Referring to FIG. 2, it will be seen that the hold attachment 11 comprises a bridge rectifier 31 having the input terminals 25 and 26 and the output terminals 27 and 28, with the respective diodes D1, D2, D3 and D4 connected as the arms of the bridge rectifier so as to provide unidirectional output at terminals 27, 28 regardless of the polarity of the input at terminals 25 and 26. Said diodes may be of the 1N4005 type.

Wire 23 is connected to terminal 25, and wire 24 is connected to terminal 26 through a normally open, momentary push button switch SW1 and a wire 29. Switch SW1 is mounted on the top wall of housing 21 adjacent one end thereof, as shown in FIG. 1.

Connected to the output terminals 27 and 28 is a series circuit comprising a zener diode ZD1, which may be of the 1N4743 type having a zener voltage of 13 v., the winding 30 of a relay K1, having a resistance of approximately 240 ohms, and a light-emitting diode D5. The relay K1 has the normally open contacts K1A, which are connected across the wires 24 and 29, namely, in shunt with switch SW1.

The light-emitting diode D5 is mounted on the top wall of housing 21 at the end thereof opposite switch SW1, as shown in FIG. 1.

In the installation of the hold device 11, the connection wires 23 and 24 are connected to the telephone line terminals 16 and 15 without regard to tip and ring polarity, since the device is not polarity-sensitive.

In the unoperated mode, the hold circuit of device 11 presents no loading and causes no unbalance of the telephone line.

When the user of an instrument equipped with a hold device 11 wishes to place an established call on hold, he does so in the following manner: push button switch SW1 is depressed and the handset 41 is placed back on hook; then switch SW1 is released. When the handset is placed back on hook with switch SW1 closed, the telephone is disconnected from across the line by the opening of contacts 17, 19 and 18, 20, which causes the voltage between tip and ring conductors 13, 14 to rise back up to the supply voltage of the central office. Central office voltage can be between 45 v.d.c. and 52 v.d.c. As the voltage rise goes through the threshold of 21.5 v.d.c., the zener diode ZD1 conducts, allowing current to flow from one side of the line, for example, through wire 23, diode D1, L.E.D. D5, relay winding 30, zener diode ZD1, diode D4, wire 29 and switch SW1 to wire 24 at the other side of the line. This action causes L.E.D. D5 to illuminate, giving visual indication that the line is on hold. Also, relay K1 operates, closing contacts K1A, which maintains the connection across the tip and ring conductors 14, 13 after switch SW1 has been released.

With reversed polarity of wires 23, 24 the current path is through diodes D2, D3 instead of D1, D4.

In this mode of operation (unit activated) an effective resistance of about 240 ohms is seen across the tip and ring conductors 13, 14 by the central office equipment. This allows sufficient current to flow out from the central office through device 11 and back, so that the switching equipment in the central office will remain sustained, thereby maintaining the talking connections between the telephone instrument 12, even though it is back on hook, and the called party.

To release the hold it is merely necessary to lift the handset of any telephone on the same line (connected across tip and ring wires 13, 14). By doing this, the off-hook telephone instrument is placed across the tip and ring conductors 13, 14, which thus presents a much lower resistance across conductors 13, 14 than device 11, in the active mode, alone. Thus, device 11 is placed in parallel with the off-hook telephone. With these elements in parallel, the voltage developed across them will drop to a value somewhere between 16 v.d.c. and 8 v.d.c., depending on the resistance between the central office and the off-hook telephone. With this action, an insufficient voltage is available to maintain zener diode ZD1 in conduction, so that the afore-mentioned series circuit will stop conducting. Relay K1 will release, opening the contacts K1A, and thereby opening the connection to line wire 13, thus removing device 11 from across the line. The L.E.D. indicator D5 on the housing 21 will become extinguished, signifying that the hold function has been released.

It will be seen that the device 11 acts as a voltage-responsive line current-maintaining dummy load, which, with switch SW1 closed, automatically substitutes itself for the telephone 12 responsive to the rise in steady state line voltage which occurs when line switch 40 opens upon the replacement of handset 41, and which automatically removes itself from the line when the handset 41 of telephone 12, or that of any other telephone connected to the same line, is picked up.

It will further be seen that the device 11 is not polarity-sensitive, and will continue to function even if the polarity of the line is reversed when the called party answers, as is the practice in many telephone exchanges.

It will also be apparent that the device 11 is not affected by ordinary line transient effects, since its circuit relies on a steady state drop in voltage below a voltage established by zener diode ZD1. The circuit will not respond to line transients less than 20 ms in duration, which makes it immune to the usual line voltage transients; furthermore, the hold device 11 is not under the control of the called party.

The relay K1 latches through its own contacts K1A. While the device is operating it would require a disruption of line current sufficient in amplitude and duration to render zener diode ZD1 non-conducting in order to release relay K1.

While a specific embodiment of an improved telephone hold attachment has been disclosed in the foregoing description, it will be under stood that various modifications within the spirit of the invention may occur to those skilled in the art. Therefore it is intended that no limitations be placed on the invention except as defined by the scope of the appended claims.

What is claimed is:

1. A telephone hold circuit for connection to a telephone line having tip and ring conductors, comprising a bridge rectifier having respective pairs of input and output terminals, first circuit means including a manually operated momentary switch connecting said input terminals to said line conductors, a relay, voltage-responsive conducting means, second circuit means connecting the winding of said relay and said voltage-responsive conducting means in series to said output terminals, said relay having a pair of normally open contacts, and third circuit means connecting said contacts in shunt with said manually operated momentary switch.

2. The telephone hold circuit of claim 1, and indicator means connected in series with said voltage-responsive conducting means and relay winding.

3. The telephone hold circuit of claim 1, and wherein said voltage-responsive conducting means comprises a zener diode.

4. The telephone hold circuit of claim 3, and indicator means connected in series with said zener diode and relay winding.

5. The telephone hold circuit of claim 4, and wherein said indicator means comprises a light-emitting diode.

6. The telephone hold circuit of claim 4, and wherein the series-connected indicator means, zener diode and relay winding and the bridge rectifier have a combined effective impedance similar to that of a telephone network.

7. The telephone hold circuit of claim 4, and wherein the zener diode has a conduction voltage which when added to the voltage drop across the indicator means lies in a range between the output voltage of the bridge rectifier when the tip and ring line conductors are unloaded and the output voltage of said bridge rectifier developed when the tip and ring conductors are loaded by the connection of a telephone network thereto.

* * * * *